United States Patent
Leonardi et al.

(10) Patent No.: US 12,517,736 B2
(45) Date of Patent: Jan. 6, 2026

(54) COMPUTER PLATFORM WITH ADDITIONAL CONFIGURATION FILE, RELATED ELECTRONIC AVIONICS SYSTEM

(71) Applicant: THALES, Meudon (FR)

(72) Inventors: Nicolas Leonardi, Merignac (FR); Pierrick Lamour, Merignac (FR)

(73) Assignee: THALES, Meudon (FR)

( * ) Notice: Subject to any disclaimer, the term of this patent is extended or adjusted under 35 U.S.C. 154(b) by 115 days.

(21) Appl. No.: 18/634,943

(22) Filed: Apr. 14, 2024

(65) Prior Publication Data
US 2024/0354122 A1    Oct. 24, 2024

(30) Foreign Application Priority Data
Apr. 20, 2023  (FR) ........................................ 2303958

(51) Int. Cl.
G06F 9/44       (2018.01)
G06F 9/445      (2018.01)
G06F 21/64      (2013.01)

(52) U.S. Cl.
CPC .......... *G06F 9/44505* (2013.01); *G06F 21/64* (2013.01)

(58) Field of Classification Search
CPC .................................... G06F 1/32; G06F 9/44
See application file for complete search history.

(56) References Cited

U.S. PATENT DOCUMENTS

2011/0296151 A1   12/2011   Martinez
2013/0159477 A1   6/2013    Danielsson et al.

FOREIGN PATENT DOCUMENTS

FR          2960668 A1        12/2011

OTHER PUBLICATIONS

FR 2303958, INPI Rapport de Recherche Preliminaire, Nov. 30, 2023, 2 pages.

*Primary Examiner* — Keshab R Pandey
(74) *Attorney, Agent, or Firm* — Soquel Group LLC (57) ABSTRACT

A computer platform on board an aircraft, that executes a set of application partitions, hosts an operating system and includes: resources; a boot package including a kernel, at least one resource driver, a set of system partitions and at least one resource configuration table, each system partition including at least one operating system service; and a boot controller able to be executed first, following power-up of the platform and configured to launch the boot package. The boot controller verifies whether an additional configuration file is present in the storage memory, and launches, before the boot package, the additional configuration file including at least one resource configuration table, then used instead of a respective table of the same type from among the at least one table of the boot package.

16 Claims, 8 Drawing Sheets

COMPUTER PLATFORM WITH
ADDITIONAL CONFIGURATION FILE,
RELATED ELECTRONIC AVIONICS
SYSTEM

CROSS-REFERENCE TO RELATED APPLICATIONS

This application is a U.S. non-provisional application claiming the benefit of French Application No. 23 03958, filed on Apr. 20, 2023, which is incorporated herein by reference in its entirety.

TECHNICAL FIELD OF THE INVENTION

The present invention relates to a computer platform able to execute a set of application partitions, each one including an avionics software application, including resources and hosting an operating system.

The invention also relates to an electronic avionics system intended to be on board an aircraft, the avionics system comprising such a computer platform.

The invention relates to the field of configuring software applications, in particular avionics applications, able to be loaded onto a computer platform comprising resources, including a processor and at least one memory.

Such software applications, also known as Loadable Software Parts or LSPs, are generally configurable:

either during design time, by integrating them during the generation of the configuration values adapted to the execution context of the respective software application;

or during run time, by fetching this configuration from a dedicated software or hardware memory zone provided for this purpose. It is then necessary to pre-program said memory zones with the appropriate configuration parameters.

Such loadable avionics software applications typically comply with the ARINC 665 standard, also known as A665, in its version A665-3 dated Dec. 8, 2005 and subsequent versions.

BACKGROUND OF THE INVENTION

In the case of software applications that can be configured during the design stage, a computer platform able to execute the set of application partitions is known, the platform comprising resources, of which, hardware resources and hosting an operating system, the hardware resources including a processor, RAM and storage memory. The computer platform also includes, in the storage memory, a boot package including a kernel, at least one resource driver, one set of system partitions and one hardware resource configuration table, each system partition including at least one operating system service; and a boot controller able to be executed first following power-up of the platform and configured to launch the boot package.

The advantage of configuring software applications during the design stage is to guarantee better control over the configuration taken into account, to avoid the need to add robustness to configuration values, and to facilitate certification, in particular ETSO (European Technical Standard Order) certification, of software applications by allowing precise characterization of platform performance during the design stage, without any possible variation linked to a user context at runtime.

However, changes in the execution context of software applications very often require new versions of software applications to be regenerated, incorporating the new configuration values.

SUMMARY OF THE INVENTION

The aim of the invention is to provide a computer platform allowing the changes to be easily taken into account in the execution context of software applications.

To this end, the invention has as its object a computer platform intended to be on board an aircraft and able to execute a set of application partitions, the platform hosting an operating system and including resources, of which, hardware resources including a processor, a random access memory and a storage memory;

the computer platform further including in the storage memory:
a boot package including a kernel, at least one resource driver, one set of system partitions and at least one resource configuration table, each system partition including at least one operating system service, the or each table being selected from among the group consisting of: a table of a first type containing configuration values of hardware resources, a table of a second type containing configuration values of resources used by a respective set of partitions, a table of a third type containing configuration values of resources used by a respective partition, the first, second and third types being distinct from one another, one of the at least one table being of the first type; and
a boot controller able to be executed first when the platform is powered up, and configured to launch the boot package;
the boot controller being configured to verify whether an additional configuration file is present in the storage memory, and then to launch the additional configuration file before the boot package,
the additional configuration file including at least one resource configuration table of a type selected from among the first, second and third types; each table of the additional configuration file then being used in place of a respective table of the same type from among the at least one table of the boot package.

With the computer platform according to the invention, the additional configuration file including at least one resource configuration table makes it easier to take into account evolution in the execution context of the software application(s) by allowing new configuration values to be added after the design of said software application(s).

In other words, the computer platform according to the invention allows the software applications configuration to be carried out during design, with the associated advantages, while allowing new configuration values to be added after said design, thus remedying the aforementioned drawback.

Preferably, the boot controller is configured to launch the additional configuration file before the boot package if said additional file includes a table of the first type, in other words, containing the hardware resource configuration values, and the or each configuration table of the additional configuration file then replaces the configuration table of the same type from among the at least one primary table.

More preferably, if the additional configuration file includes a hardware resource configuration table, that is, a table of the first type, then the hardware resource configuration values contained in said table each belong to value ranges for which the computer platform has been previously certified, which allows the benefit of the certification carried out to be retained, and then avoid a new certification, or recertification.

Even more preferably, the additional configuration file is constituted of the at least one configuration table, and the additional configuration file is then easier to generate and quicker to load than a new version of the boot package modified to introduce the new configuration values.

In other advantageous aspects of the invention, the computer platform comprises one or more of the following features, either individually or in any technically possible combination:

- if, during verification for the presence of said additional configuration file, the storage memory does not contain an additional configuration file, then the boot controller is configured to launch the boot package;
- the boot controller is configured to launch the additional configuration file only if at least one launch condition is met, each launch condition being selected from among the group consisting of: an authenticity verification of the additional configuration file, and an integrity verification of the additional configuration file;
- the boot controller being preferably configured to launch the additional configuration file only if all the launch conditions are met, from among the authenticity verification of the additional configuration file and integrity verification of the additional configuration file;
- the computer platform is able to operate in an operating mode selected at least from a degraded mode in which only the set of system partitions is executable from among the sets of system partitions and application partitions, and an operational mode in which the sets of system partitions and application partitions are each executable;
- at least one from among the boot package and the additional configuration file contains a second type resource configuration table for the degraded mode, the second type table for the degraded mode containing resource configuration values usable by the set of system partitions;
- at least one from among the boot package and the additional configuration file contains at least one resource configuration table of the third type for degraded mode, each table of the third type related to a respective system partition for degraded mode containing the resource configuration values used by said system partition in degraded mode;
- the boot package and the additional configuration file each include at most one configuration table of the first type;
- if the additional configuration file includes a configuration table of the first type, then the hardware resource configuration values contained in said table each belong to value ranges for which the computer platform has been previously certified;
- the boot package and/or the additional configuration file include several configuration tables of the second type and/or several configuration tables of the third type.

The invention also has as its object an avionics electronics system intended to be on board an aircraft, the avionics system comprising:

- a computer platform able to execute a set of application partitions, the computer platform being as defined above;
- a secondary resource configuration table, the secondary table being of the second type, stored in the storage memory, and containing the resource configuration values usable by the set of application partitions; and
- the set of application partitions, each application partition including an avionics software application and a tertiary resource configuration table, each tertiary table being of the third type and containing the resource configuration values used by the respective application partition, the set of application partitions being stored in the storage memory.

In other advantageous aspects of the invention, the avionics system comprises one or more of the following features, either individually or in any technically possible combination:

- the avionics system comprises, in the storage memory, at least one additional configuration file;
- the avionics system preferably comprising several additional configuration files;
- such that the additional configuration file including at least one configuration table, one of which is of a first type, and at least one other additional configuration file including at least one configuration table of a type selected from among the second and third types;
- the or each additional configuration file includes only the at least one configuration table of a type selected from among the first, second and third types;
- the or each additional configuration file preferably constituted of the at least one configuration table of a type selected from among the first, second and third types; and
- the avionics system further comprises a display screen and/or a human machine interface.

BRIEF DESCRIPTION OF THE DRAWINGS

These features and advantages of the invention will become clearer on reading the following description, given solely by way of non-limiting example, and made with reference to the appended drawings, in which:

FIG. 1 is a schematic representation of an aircraft equipped with an electronic avionics system comprising a set of application partitions and a computer platform able to execute the application partitions, the platform including resources, of which, the hardware resources including a processor, RAM and storage memory, and hosting an operating system; the platform further comprising a boot controller and a boot package including a kernel, a resource driver, a set of system partitions; the avionics system comprising primary, secondary and tertiary resource configuration tables, these tables being of first, second and third types respectively; the boot controller being configured to verify whether at least one additional configuration file including at least one configuration table is present in the storage memory and to launch the additional configuration file if necessary; the at least one additional configuration table then being used in place of at least one respective table of the same type;

DETAILED DESCRIPTION

Figure 1:
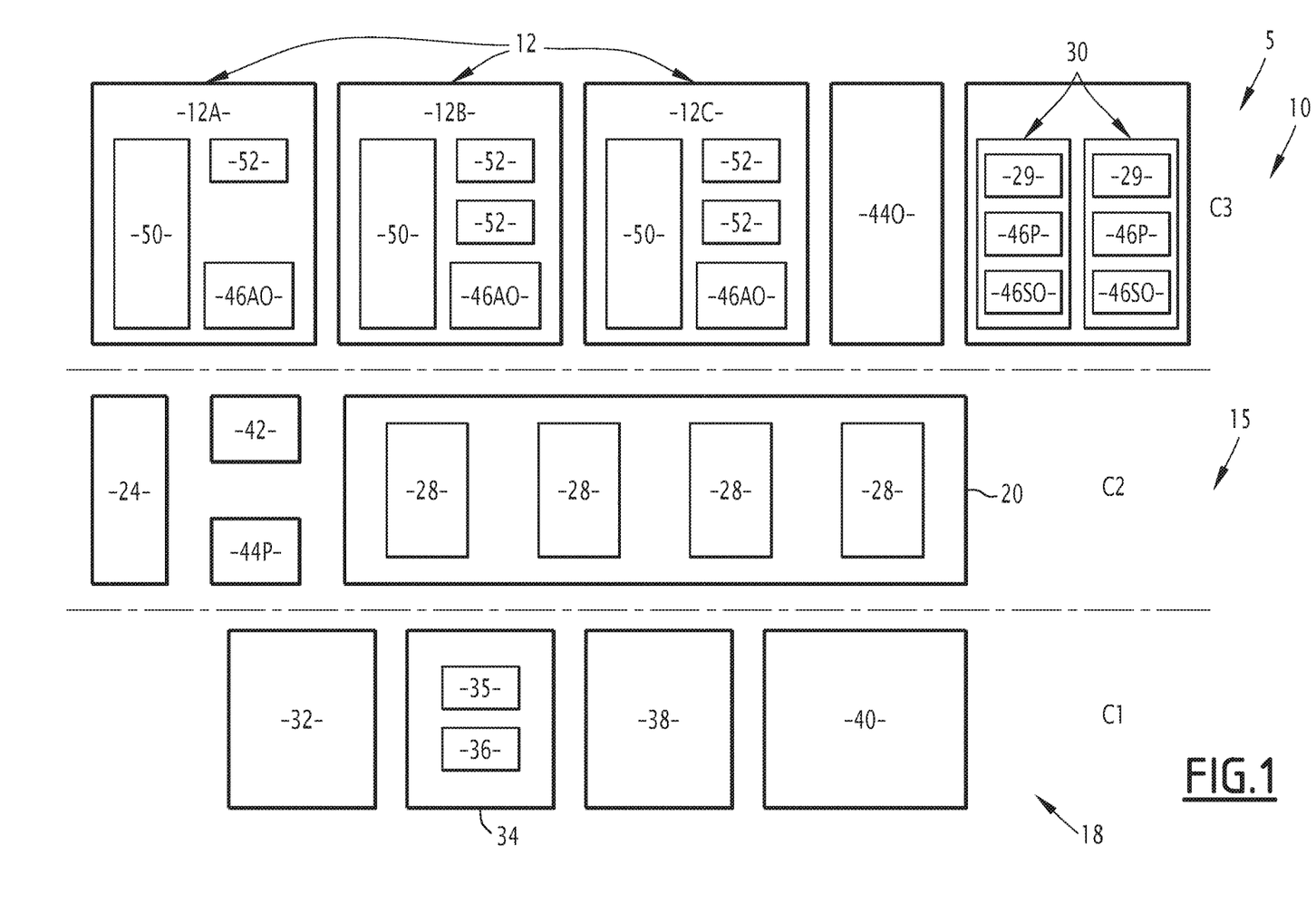

In FIG. 1, an aircraft 5 is equipped with an electronic avionics system 10 comprising a set of application partitions 12 and a computer platform 15 able to execute the set of application partitions 12.

Preferably, the aircraft 5 is an airplane. Alternatively, the aircraft 5 may be a helicopter, or a drone piloted remotely by a pilot.

The computer platform 15 includes resources 18 and hosts an operating system 20. The computer platform 15 also includes a boot package 22, visible in FIGS. 2 to 8, and a boot controller 24 able to be executed first following power-up of the platform 15 and configured to launch the boot package 22.

Advantageously, the computer platform 15 also includes a first additional configuration file 26, visible in FIGS. 2 to 8 and described in greater detail below.

The operating system 20, also known as OS, is, for example, an ARINC 653-compliant operating system, or a POSIX operating system, or even a hypervisor, or even a middleware.

The person skilled in the art will then understand that the operating system 20 is understood in a broad sense and is, more generally, a set of at least one basic software 28, designed to offer services 29 of various types to each application partition 12 and/or system partition 30.

A service 29 is therefore a function of the basic software that can be used by the application(s) and reached by a call, also known as a service call (of the OS) or even a system call. One example of basic software is an ARINC 653 or POSIX OS that provides such services. In the context of the invention, the person skilled in the art will understand that it is the notion of calling a service that is important, and not the service as such, offered by the basic software.

The services 29 offered by the operating system 20 are known per se, and are, for example, input(s)/output(s) acquisition services, process management services, communication protocol(s) management services, and so on. The types of service are therefore input/output acquisition, process management, communication protocol management and timer management, in particular triggering.

The avionics system 10 also comprises a set of system partitions 30, each system partition 30 including at least one service 29 of the operating system 20.

The resources 18 of the platform 15 are physical elements, that is, hardware, or logic elements able to be made available to the application partitions 12 and/or the system partitions 30.

The resources 18 include the hardware resources, in particular a processor 32, and memory resources 34, such as a random access memory 35 and a storage memory 36. The storage memory 36 is, for example, programmable read-only memory, such as a PROM or FPROM (Programmable Read Only Memory or Field Programmable Read Only Memory).

In addition, the resources 18 include input and output resources 38, also known as IO resources, and graphic resources 40, in other words, allowing data to be displayed.

In addition, the resources 18 further include resources specific to the avionics network, which are not shown. Such resources are, for example, communication routers of an ARINC664 network, in particular ARINC664 Part 3 or ARINC664 Part 7.

The computer platform 15 is typically able to operate in an operating mode selected from among at least a degraded mode, also noted PDL, where only the set of system partitions 30 is executable from among the sets of system partitions 30 and the application partitions 12, and an operational mode, also noted OPS, where the sets of system partitions 30 and the application partitions 12 are each executable.

The boot package 22 includes a kernel, at least one resource driver, a respective set of system partitions 30 and a primary resource configuration table 42, each system partition 30 including at least one service 29 of the operating system 20, the primary table 42 being of a first type, noted HWCT.

In addition, the avionics system 10 comprises at least one secondary resource configuration table 44, stored in the storage memory 36, each secondary table 44 being of a second type, noted MGCT, the second type MGCT being distinct from the first type HWCT.

Advantageously, the avionics system 10 comprises at least two distinct secondary tables 44, at least one noted 44O being provided for the computer platform 15 in the operational mode of operation, and at least the other noted 44P being provided for the computer platform in the degraded mode of operation. Each secondary resource configuration table 44O related to the operational mode of operation contains the resource configuration values usable by a respective set of application partitions. Each secondary resource configuration table 44P related to the degraded operating mode contains the resource configuration values usable by a respective set of system partitions.

As a further addition, the avionics system 10 comprises a set of system tertiary resource configuration tables 46SO, 46P for the set of system partitions 30, stored in the storage memory 36. Each system tertiary table 46SO, 46P is of a third type HACT. The third type HACT is distinct from both the first type HWCT and the second type MGCT. In the example of FIG. 1, each system tertiary table 46SO, 46P is included within a respective partition 30.

Advantageously, the avionics system 10 comprises a resource configuration table of the second type MGCT for each of the operating modes from among the degraded mode 44P and the operational mode 44O. The second type table for the degraded mode 44P is constituted of the resource configuration values usable by the set of system partitions 30. The second type of table for the operational mode 44O is constituted of the resource configuration values usable by the set of application partitions 12.

Advantageously still, the avionics system 10 comprises, for each system partition 30, a resource configuration table of the third type HACT for each of the operating modes from among the degraded mode PDL and the operational mode OPS. Each third type table related to a respective system partition 30 for the HACT_PDL degraded mode is constituted of the resource configuration values used by said system partition 30 in degraded mode PDL. Each third type table related to a respective system partition 30 for the operational mode 46SO is constituted of the resource configuration values used by said system partition 30 in operational mode OPS.

Each application partition 12 includes an avionics software application 50 and a tertiary resource configuration application table 46AO. Each tertiary application table 46AO is of the third type HACT and contains resource configuration values used by the respective application partition 12. Each avionics software application 50 is intended to be executed by the platform 15, is then designed to issue one or more calls to the operating system 20 and is also configured to use the platform resources 18.

Each application partition 12 is able to be executed only in the operational mode OPS and is not executed in the degraded mode PDL. Each system partition 30 is able to be executed in both the operational mode OPS and in the degraded mode PDL.

In addition, each application partition 12 also includes at least one library 52. Each library 52 is a set of functions, classes, interfaces or software modules that are grouped together for easier use by the respective avionics software application 50. The functions, classes, interfaces or even software modules of a respective library 52 relate, for example, to database management, file handling, graphics creation, or even communication with other avionics software applications 50. When the software application 50 is executed, the or the libraries 52 of the corresponding application partition 12 are loaded into the memory, and the elements it contains are then able to be called up from the application 50 code.

Each application partition 12 typically includes, and preferably is constituted of, a single avionics software application 50 and one or more libraries 52 related to this avionics software application.

In the example of FIG. 1, the avionics system 10 comprises three application partitions 12, namely a first application partition 12A, a second application partition 12B and a third application partition 12C. In this example, the first application partition 12A contains a single library 52, and the second and third application partitions 12B, 12C each contain two libraries 52.

A configuration table of the first type HWCT contains resource configuration values for the hardware of the computing platform 15, and thus forms a hardware resource configuration table for the platform 15. The configuration table of the first type HWCT typically comprises values for the following magnitudes: operating frequency of the processor 32; number of processor 32 cores; amount of RAM, that is, size of the RAM 35; amount of cache memory, that is, size of the processor 32 memory; number of inputs/outputs from among the I/O resources 38; frequencies supported according to the ARINC 429 standard, pre-scaler value to be programmed for message dating, etc.

A configuration table of the second type, MGCT, contains the resource configuration values that can be used by a respective set of partitions, for example by the set of application partitions 12, or even respectively by the set of system partitions 30.

As the computer platform 15 being likely to be included in different avionics systems 10 and/or positioned in different positions on board the aircraft 5, the resources 18 usable by a respective set of partitions 12, 30 do not necessarily correspond to all the supportable resources of the platform 15. These usable resources generally correspond only to a portion of said resources 18, strictly smaller, that is, more reduced, than the totality of said resources 18, the values of which are directly linked to the position of the computer platform 15 on board the aircraft 5.

The configuration table of the second type MGCT typically comprises the values of the following magnitudes: amount of processor 32 time usable by the respective set of partitions 12, 30; number of processor 32 cores usable by said set of partitions 12, 30; amount of RAM 35 usable by said set of partitions 12, 30; amount of cache memory usable by said set of partitions 12, 30; input/output identifier(s) usable by said set of partitions 12, 30; cursor movement acceleration coefficients on the touch screens included in the graphics type resources 40; threshold for triggering a partition 12, 30 sanction by a monitoring module of the computer platform 15. The partition sanction typically depends on an authorization related or not to the partition 12, 30 which is the subject of this sanction. When the partition 12, 30 is a partition with authorization, for example with module level rights, the partition sanction is a restart of the platform 15. When the partition 12, 30 is a partition without authorization, for example without module level rights, the partition sanction is a restart of the partition 12, 30 concerned.

A configuration table of the third type HACT contains the resource configuration values used by a respective partition 12, 30, for example by a respective application partition 12, or even by a respective system partition 30.

Preferably, each configuration table of the third type HACT for a respective application partition 12, as well as each configuration table of the third type HACT for a respective system partition 30, must be compatible with the budgets of the configuration table of the second type MGCT for the sets of application partitions 12 and system partitions 30. In other words, the sum of the configuration values contained in all the respective third type HACT configuration tables must not exceed those contained in the corresponding second type MGCT configuration table.

The configuration table of the third type HACT typically comprises the values of the following magnitudes: identifier(s) of the processor 32 time window(s) used by the respective partition 12, 30; identifier(s) of processor 32 core(s) used by said partition 12, 30; identifier of a RAM 35 zone used by said partition 12, 30; definition of communication port objects (name, size, refresh rate . . . ) and identifier of the resource concerned from among the I/Os used by said partition 12, 30.

In the example of FIG. 1, the avionics system 10 is represented in the form of a stack of layers C1, C2, C3; namely a first layer C1, also known as the hardware layer; a second layer C2 above the first layer C1, the second layer C2 also being known as the operating layer, or even OS layer; and a third layer C3, also known as the partition layer, above the second layer C2.

The first layer C1 then includes the resources 18. The second layer C2 includes the operating system 20, the boot controller 24, the primary table 42 and the secondary table 44P related to the degraded operating mode. The third layer C3 includes the set of application partitions 12, the set of system partitions 30, the secondary table 440 related to the operational mode of operation, and the tertiary system and application tables 46SO, 46AO, it being remembered that the tertiary application tables 46AO are included directly in the application partitions 12.

A person skilled in the art will note that the computer platform corresponds to the first and second layers C1, C2 of the avionics system 10.

In the examples of FIGS. 2 to 7, the avionics system 10 is represented in the form of functional levels, with a first functional level N1 corresponding to the elements likely to be launched first by the boot controller 24, namely the boot package 22 and the first additional configuration file 26. The first functional level N1 then includes the primary table(s) 42, the secondary table(s) 44P related to the degraded operating mode, and the tertiary table(s) 46P related to said degraded mode.

The avionics system 10 then includes a second functional level N2 typically including the secondary table 440 related to the operational operating mode OPS, also known as the secondary operational table 440, and one or more tertiary system tables 46SO also related to the operational operating mode OPS, as well as one or more auxiliary tables 58. The second functional level N2 is linked to the first functional level N1, the elements of the second functional level N2 being likely to be called by a corresponding element of the first functional level N1.

The avionics system 10 then includes a third functional level N3, typically including the set of application partitions 12, as well as one or more system partitions 30. The tertiary application tables 46AO are then included in this third functional level N3, each being itself included in a corresponding application partition 12. The third functional level N3 is linked to the second functional level N2, as well as to the first functional level N1, the system partition 30 being executed in degraded mode, for example, and called directly by the boot package 22 or by the first additional configuration file 26. Each application partition 12 is typically called by a corresponding element of the second functional level N2, that is, by the secondary operational table 440 or by a respective auxiliary table 58.

Finally, the avionics system 10 includes a fourth functional level N4, typically including one or more complementary software applications 56. The fourth functional level N4 is linked to the third functional level N3, each complementary application 56 being typically called by a respective application partition 12, in particular by the corresponding avionics software application 50.

According to the invention, the avionics system 10 is likely to comprise at least one additional configuration file from among the first additional configuration file 26, a second additional configuration file 60 and a third additional configuration file 62, each additional configuration file 26, 60, 62 including at least one resource configuration table of a type selected from among the first type HWCT, the second type MGCT and the third type HACT. The first additional configuration file 26 typically includes a first type HWCT table, as well as a second type MGCT table, as an optional addition, for the degraded operating mode and/or a third type HACT table for said degraded mode. The second additional configuration file 60 includes a second type MGCT configuration table and/or a third type HACT configuration table.

The third additional configuration file 62 typically includes a third type HACT configuration table. Advantageously, each of the first, second and third additional configuration files 26, 60, 62 includes only the at least one configuration table of a type selected from among the first type HACT, the second type MGCT and the third type HACT, and each of the first, second and third additional configuration files 26, 60, 62 is preferably constituted of said at least one configuration table of the aforementioned type.

Advantageously, the avionics system 10 comprises, in the storage memory 36, at least one additional configuration file 26, 60, 62, and preferably several additional configuration files 26, 60, 62 from among the first 26, second 60 and third 62 additional configuration files.

The boot controller 24 is configured to verify whether an additional configuration file 26, 60, 62 is present in the storage memory 36, and then to launch the additional configuration file 26, 60, 62, each table of the additional configuration file 26, 60, 62 then being used instead of a respective table of the same type from the primary 42, secondary 440, 44P, tertiary system 46SO, 46P and tertiary application 46AO tables.

The person skilled in the art will observe that if, during verification for the presence of said additional configuration file, the storage memory 36 contains no additional configuration file 26, 60, 62, then the boot controller 24 is configured to launch the boot package 22, in the absence of said additional configuration file 26, 60, 62.

Advantageously, if the additional configuration file 26 includes a table of the first type HWCT, then the boot controller 24 is configured to launch the additional configuration file 26 before the boot package 22.

In addition, the boot controller 24 is configured to launch the additional configuration file 26, 60, 62 only if at least one launch condition is met. Each launch condition is an authenticity verification of the additional configuration file or an integrity verification of the additional configuration file.

According to this addition, the boot controller 24 is preferably configured to launch the additional configuration file 26, 60, 62 only if all launch conditions are met, in other words, if the additional configuration file 26, 60, 62 is both authentic and has integrity.

Preferably, the boot package 22 and the first additional configuration file 26 each include at most one configuration table of the first type HWCT.

Advantageously, if the first additional configuration file 26 includes a configuration table of the first type HWCT, then the hardware resource configuration values contained in said table each belong to a range of values for which the computer platform 15 has been previously certified.

As an optional addition, the boot package 22 and/or the first additional configuration file 26 including several configuration tables of the second type MGCT and/or several configuration tables of the third type HACT.

Various examples of the implementation of the invention will now be described with reference to FIGS. 2 to 7.

Figure 2:
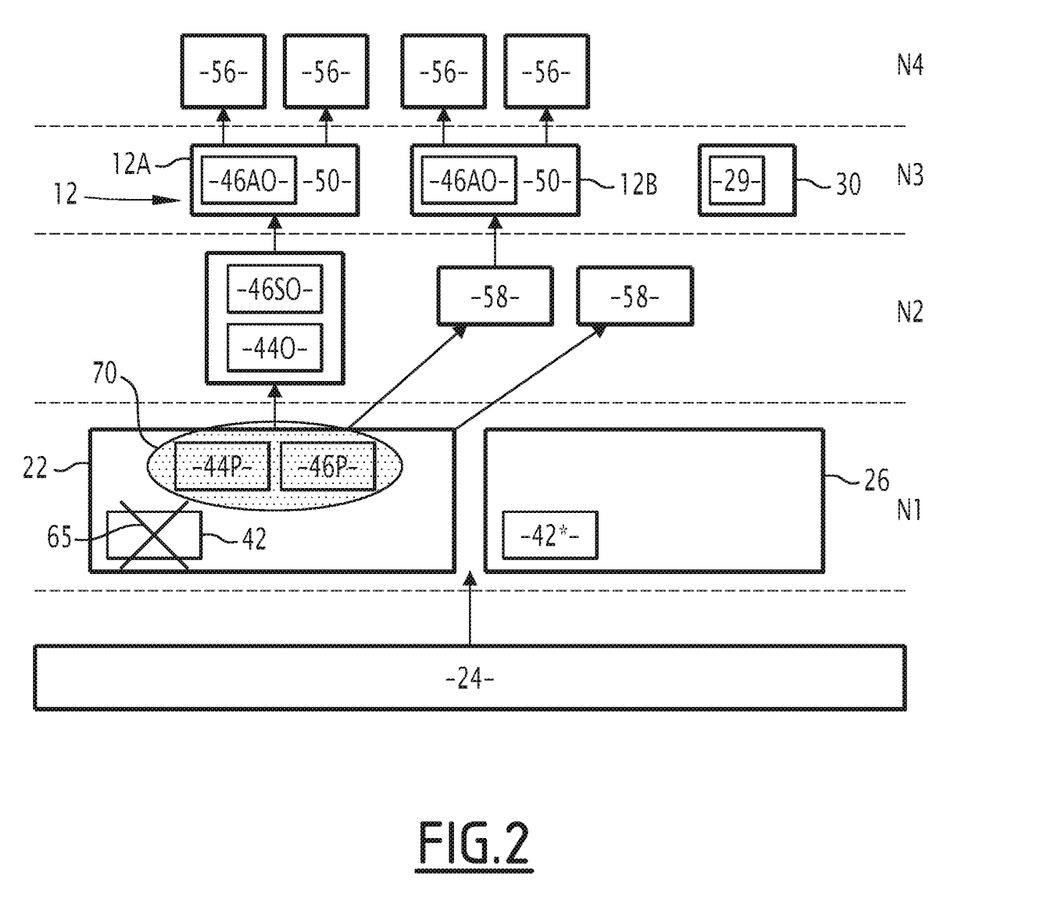
FIG. 2 is a view illustrating a first example of the implementation of the invention, in platform operational mode, where the avionics system comprises a first additional configuration file including a configuration table of the first type, then used instead of the primary table.

In the example of FIG. 2, the avionics system 10, and in particular the computer platform 15, includes the first additional configuration file 26, while no other additional configuration file is included. The boot package 22 includes the primary table 42, as well as the secondary table 44P and the tertiary table 46P related to the degraded operating mode PDL.

In this example of FIG. 2, the first additional configuration file 26 includes only one configuration table of the first type HWCT, for example a new version of the primary table 42, the new version being denoted 42*. In this example, the first additional configuration file 26 does not include a configuration table of the second type MGCT nor of the third type HACT.

When the first additional configuration file 26 is launched by the boot controller 24, the new version of the primary table 42* included in the first additional file 26 is used instead of the primary table 42 of the boot package 22. In other words, the primary table 42 of the boot package is then bypassed by the new version of the primary table 42* included in the first additional configuration file 26.

Generally speaking, in the examples of FIGS. 2 to 7, each table bypassed by another table in a respective additional configuration file 26, 60, 62 is masked by a cross 65. In the example of FIG. 2, the primary table 42 of the boot package is then masked by the cross 65.

This example of FIG. 2 corresponds to the operating mode OPS, and the secondary 44P and tertiary 46P tables related to the degraded mode PDL are therefore not used.

Generally speaking, in the examples of FIGS. 2 to 7, the unused elements of the operating mode considered in the associated example are masked by an elliptical shape 70. In the example of FIG. 2, the secondary table 44P and tertiary table 46P are masked by the elliptical shape 70.

Figure 3:
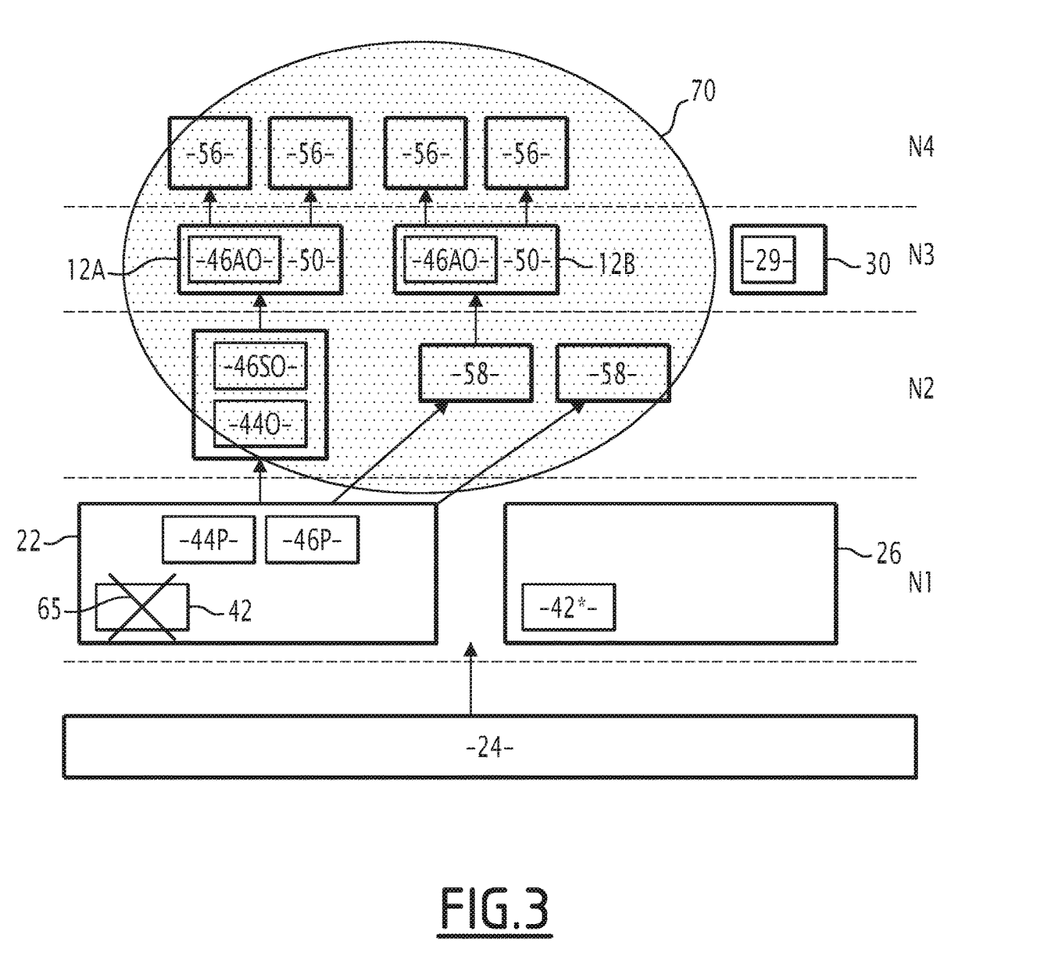
FIG. 3 is a view similar to FIG. 2 in degraded platform operating mode.

In the example of FIG. 3, the avionics system 10, and in particular the computer platform 15, includes the same elements as in the example of FIG. 2, and the example of FIG. 3 differs from that of the example of FIG. 2 in its operating mode, this example corresponding to the degraded operating mode PDL.

In the same way as in the example of FIG. 2, when the first additional configuration file 26 is launched by the boot controller 24 following power-up of the computing platform 15, the new version of the primary table 42* included in the first additional file 26 is used instead of the primary table 42 of the boot package 22.

Unlike the example of FIG. 2, the secondary 44P and tertiary 46P tables related to the degraded operating mode are those used this time, and the tables of the second type MGCT and third type HACT implemented are then those of the boot package 22, the first additional configuration file 26 including only the new version of the primary table 42* of the first type HWCT, and not including any configuration table of the second type MGCT or the third type HACT. In other words, from among the tables included in the boot package 22, only the primary table 42 is bypassed and then represented in a masked way by the cross 65, the secondary 44P and tertiary 46P tables being used normally.

This example of FIG. 3 corresponds to the degraded mode PDL of operation, the system partition 30 is executed after the boot package 22 has been implemented. The other elements of the second, third and fourth functional levels N2, N3, N4 are not used, and are then masked by the elliptical shape 70.

Figure 4:
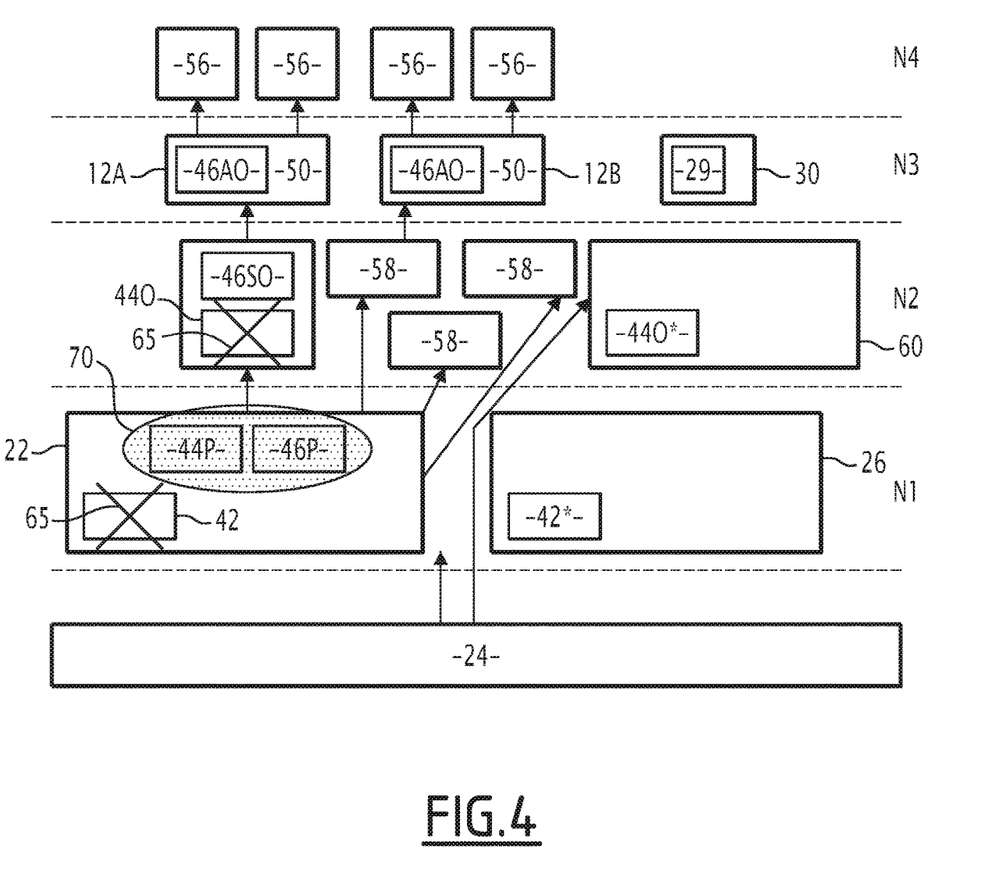
FIG. 4 is a view illustrating a second example of the implementation of the invention, in operational mode, where the avionics system comprises both the first additional configuration file including the configuration table of the first type and a second additional configuration file including a configuration table of the second type, each additional configuration file table then being used in place of a respective table of the same type initially stored in the avionics system.

In the example of FIG. 4, the avionics system 10 includes the same elements as in the examples of FIGS. 2 and 3, and also includes the second additional configuration file 60 including a configuration table of the second type MGCT, for example a new version of the secondary table 440 related to the operational mode OPS of operation, the new version being noted 440*.

Similarly to the example of FIG. 2, this example of FIG. 4 corresponds to the OPS operational mode, and the secondary 44P and tertiary 46P tables related to the degraded mode PDL are not used, these tables 44P, 46P being masked by the elliptical shape 70.

In the same way as in the examples of FIGS. 2 and 3, when the first additional configuration file 26 is launched by the boot controller 24 following power-up of the computer platform 15, the new version of the primary table 42* included in the first additional file 26 is used instead of the primary table 42 of the boot package 22.

Then, the second additional configuration file 60 is also launched by the boot controller 24, the new version of the secondary table 440* related to the operational mode OPS is used in place of that of the second functional level N2 initially stored in the storage memory 36.

In this example of FIG. 4, the tables bypassed are therefore, the primary table 42 of the boot package 22 and the initial secondary table 440 related to the operational mode OPS, these two tables being represented in a masked manner by the cross 65.

Figure 5:
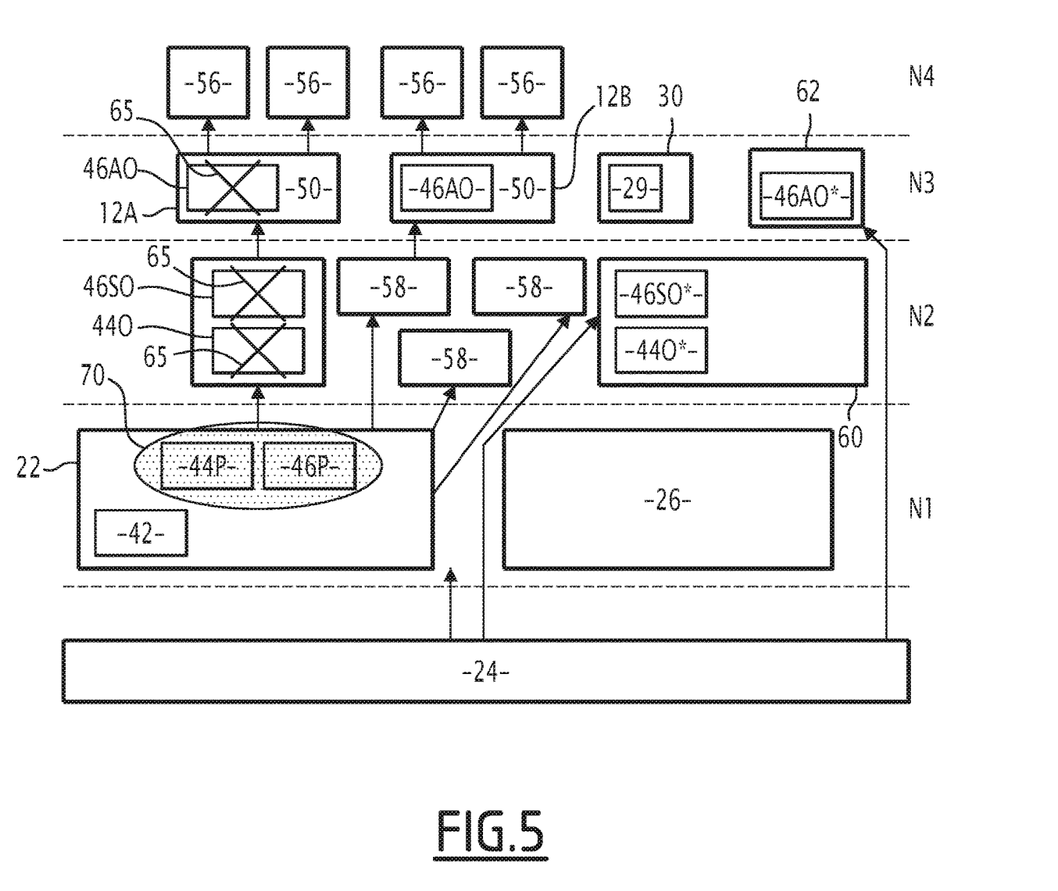
FIG. 5 is a view illustrating a third example of implementation of the invention, in operational mode, where the avionics system comprises both the second additional configuration file including this time a configuration table of the second type and a configuration table of the third type, and a third additional configuration file including a configuration table of the third type, each additional configuration file table then being used in place of a respective table of the same type initially stored in the avionics system.

The example of FIG. 5 is similar to that of FIG. 4, with the difference that in this example of FIG. 5 the avionics system 10 also comprises the third additional configuration file 62 including a configuration table of the third type HACT, for example a new version of the tertiary application table 46AO of the first application partition 12A, the new version being noted 46AO*.

A further difference between the examples of FIGS. 4 and 5 is that in the example of FIG. 5, the second additional configuration file 60 includes both a configuration table of the second type MGCT, for example the new version of the operational secondary table 440*, and a configuration table of the third type HACT, for example a new version of a respective system tertiary table 46SO, the new version being noted 46SO*, so that both the operational secondary table 440 and the respective system tertiary table 46SO are then bypassed.

A final difference between the examples of FIGS. 4 and 5 is that in the example of FIG. 5, the first additional configuration file 26 is empty and does not include a configuration table of the first type HWCT, or is absent, or even is not authentic and/or has no integrity, so that the primary table 42 of the boot package 22 is not bypassed and is used by the boot controller 24.

In this example of FIG. 5, the bypassed tables are therefore, the initial secondary table 440 related to the operational mode OPS, the respective system tertiary table 46SO and the application tertiary table 46AO of the first application partition 12A, these three tables being represented in a masked manner by the cross 65.

Figure 6:
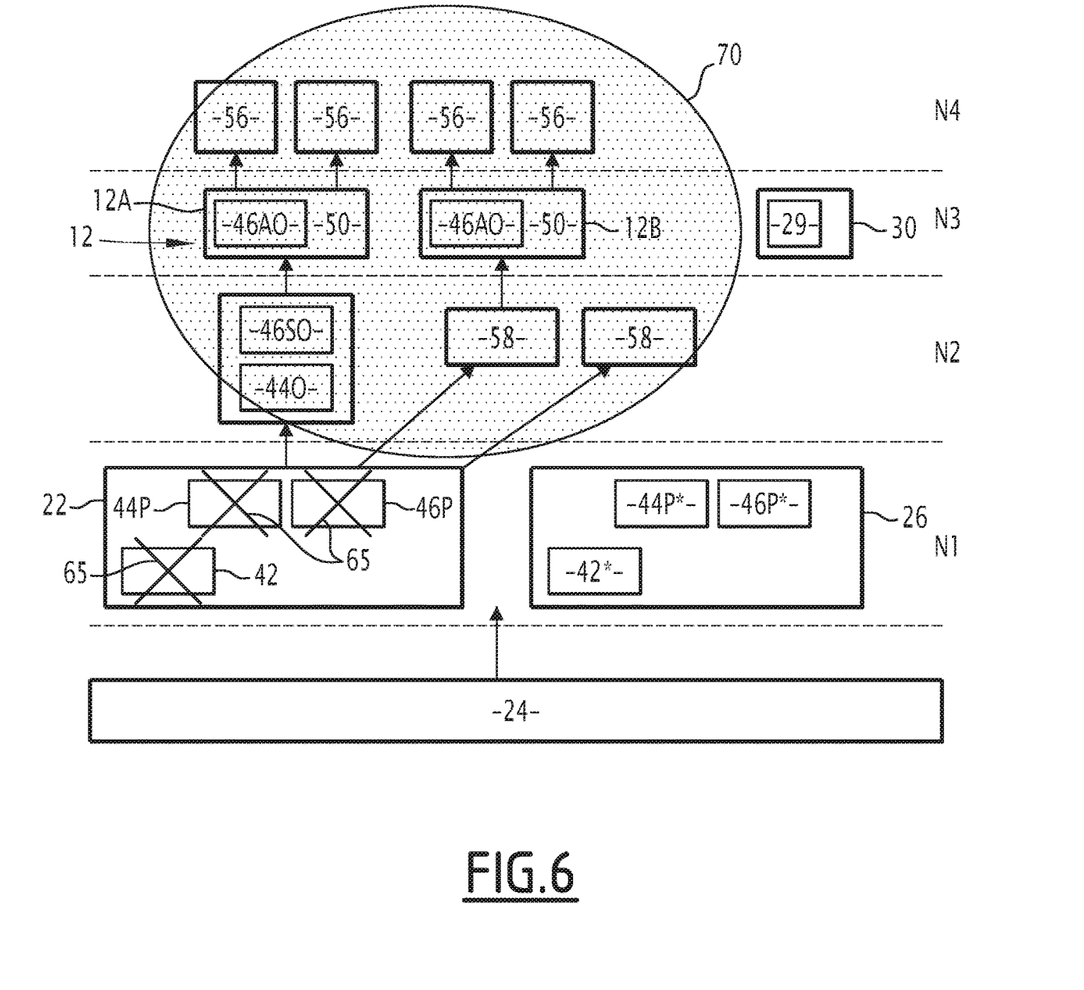
FIG. 6 is a view illustrating a fourth example of implementation of the invention, in degraded mode of operation, where the avionics system comprises the first additional configuration file including both the configuration table of the first type and the configuration tables of the second and third types, then used in place of the respective primary, secondary and tertiary tables.

The example of FIG. 6 is similar to that of FIG. 3, with the difference that in this example of FIG. 6, the first additional configuration file 26 includes both a configuration table of the first type HWCT, for example the new version of the primary table 42*, a configuration table of the second type MGCT, for example a new version of the secondary table 44P related to the degraded mode PDL, the new version being noted 44P*, and also a configuration table of the third type HACT, for example a new version of the tertiary table 46P related to the degraded mode PDL, the new version being noted 46P*.

In this example of FIG. 6, the tables bypassed are the primary table 42, and the secondary table 44P and tertiary table 46P related to the degraded mode PDL, these three tables of the boot package 22 being represented in a masked manner by the cross 65.

This example of FIG. 6 corresponding to the degraded operating mode PDL, the system partition 30 is executed after implementation of the first additional configuration file 26. The other elements of the second, third and fourth functional levels N2, N3, N4 are not used, and are therefore masked by the elliptical shape 70.

Figure 7:
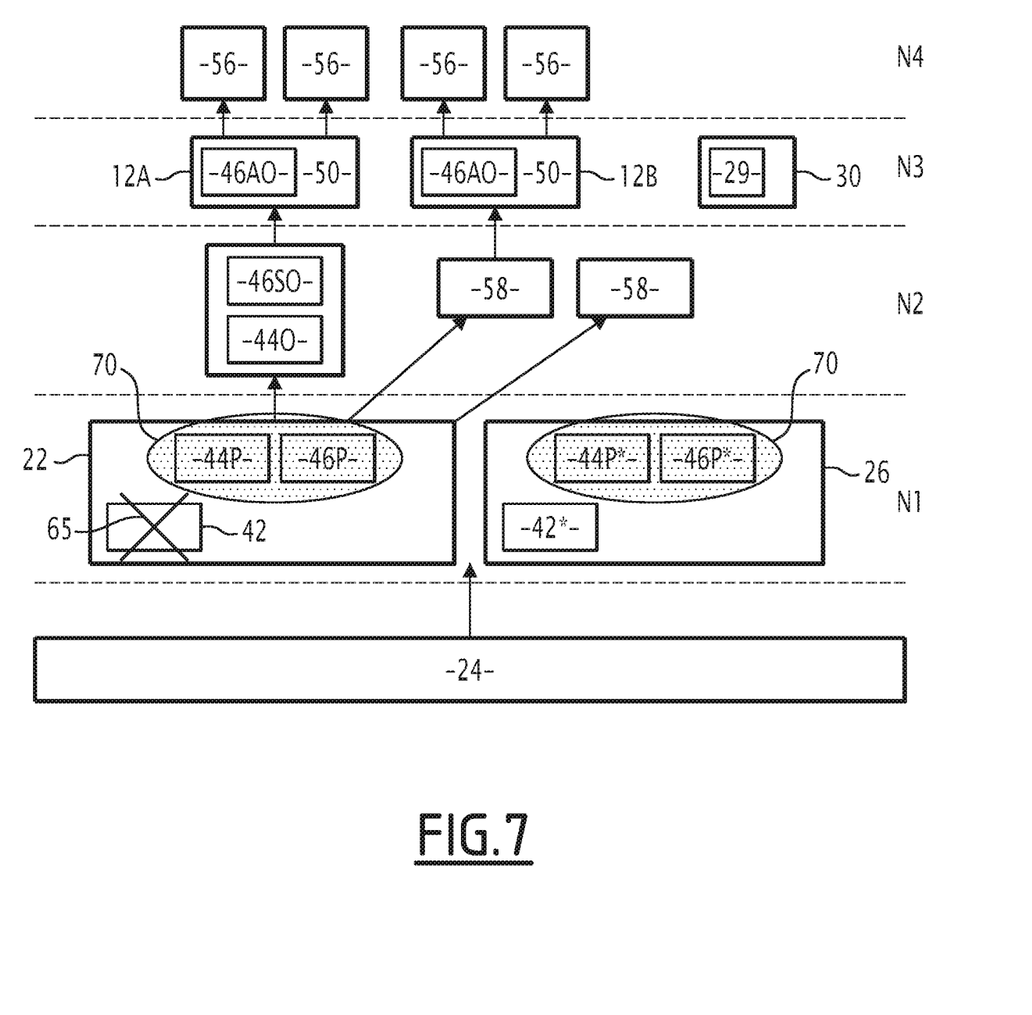
FIG. 7 is a view similar to FIG. 6, in operational mode of operation, in which the configuration tables of the second and third type included in the first additional configuration file are not used.

In the example of FIG. 7, the avionics system 10, and in particular the computer platform 15, includes the same elements as in the example of FIG. 6, and the example of FIG. 7 differs from that of FIG. 6 in the mode of operation, this example corresponding to the operational mode OPS.

In the same way as in the example of FIG. 6, when the first additional configuration file 26 is launched by the boot controller 24 following power-up of the computer platform 15, the new version of the primary table 42* included in the first additional file 26 is used instead of the primary table 42 of the boot package 22.

On the other hand, unlike the example of FIG. 6, the secondary 44P and tertiary 46P tables related to the degraded mode PDL, whether it is those in the boot package 22 or those in the first additional configuration file 26, are not used, and are therefore masked by the elliptical shape 70.

In this example of FIG. 7, the only table bypassed is the primary table 42 of the boot package 22, which is then represented in a masked manner by the cross 65.

The person skilled in the art will note that the examples of FIGS. 2, 3, 6 and 7 relate more specifically to the computer platform 15, with only the first additional configuration file 26 of the additional configuration files 26, 60, 62 being present in the storage memory 36 in these examples.

The person skilled in the art will also understand that the various possible cases are as follows for the avionics system 10 according to the invention:
  presence of the first additional configuration file 26, but not of the second and third additional configuration files 60, 62: the bypassed table(s) are then the tables of the boot package 22 for which a new version is present in the first additional configuration file 26, and also taking into account the operating mode, the secondary 44P and tertiary 46P tables being used only in the degraded operating mode PDL;
  presence of the second additional configuration file 60, but not of the first and third additional configuration files 26, 62: the bypassed table(s) are the initial secondary table 44O related to the OPS operating mode and/or one or more system tertiary tables 46SO for which a new version is present in the second additional configuration file 60;
  presence of the third additional configuration file 62, but not of the first and second additional configuration files 26, 60: the bypassed table(s) are one or more application tertiary tables 46AO for which a new version is present in the third additional configuration file 62;
  presence of the first and second additional configuration files 26, 60, but not of the third additional configuration file 62, with the tables for which a new version is present in these additional configuration files 26, 60 bypassed as described above;
  presence of the second and third additional configuration files 60, 62, but not of the first additional configuration file 26, bypassing as described above those tables for which a new version is present in these additional configuration files 60, 62;
  presence of all additional configuration files, in other words, the first, second and third additional configuration files 26, 60, 62, bypassing as described above of the tables for which a new version is present in these additional configuration files 26, 60, 62.

The boot sequence of the avionics system 10 according to the invention will now be explained with reference to the flowchart of FIG. 8.

When power is applied to the avionics system 10, and therefore to the computer platform 15 contained within it, the boot controller 24 is executed first by the processor 32, as represented by the arrow F1.

Figure 8:
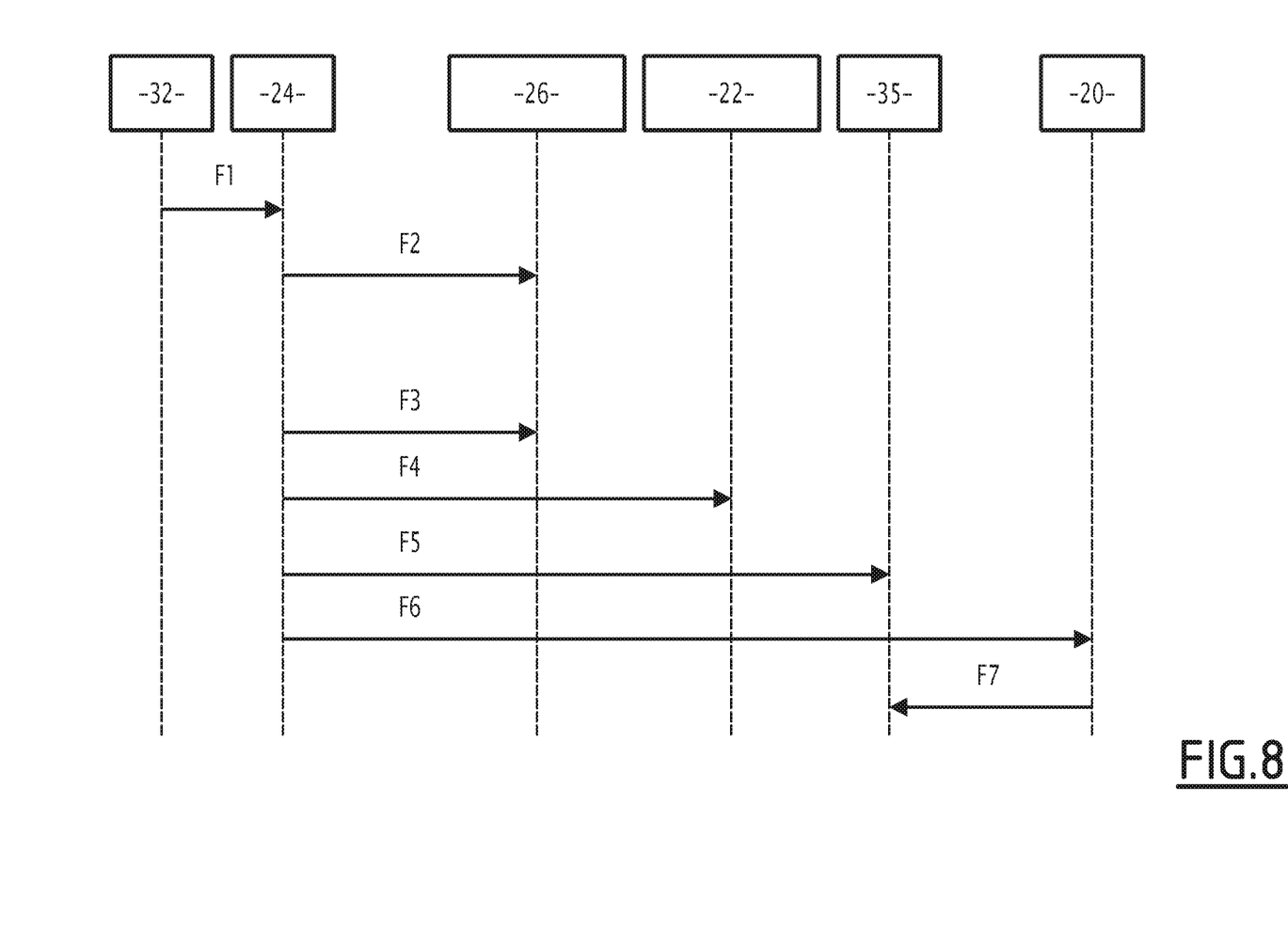
FIG. 8 is a flow chart representing a start-up sequence for the avionics system shown in FIG. 1, verifying the presence or absence of at least one additional configuration file.

The boot controller 24 then begins by verifying whether the first additional configuration file 26 is present in the storage memory 36 at a predefined location, provided for this purpose, this presence verification being represented by the arrow F2 of FIG. 8.

If the first additional configuration file 26 is present at this location in the storage memory 36, the boot controller 24 advantageously verifies the authenticity and integrity of the first additional configuration file 26, as represented by the arrow F3, and if this verification is positive, in other words, if the first additional configuration file 26 is both authentic and integral, the boot controller 24 will then copy each table contained in the first additional configuration file 26 into the RAM 35.

If, during the presence verification previously carried out according to the arrow F2, the boot controller 24 determined that no additional configuration file 26 was present in the storage memory 36, or even that a file was present but without a table, then the boot controller 24 launches the boot package 22, as represented by the arrow F4, and will then in particular use the configuration tables that the boot package 22 contains.

The boot controller 24 then copies the table(s) resulting from the verifications carried out previously according to the arrows F2 and F3 back into the RAM 35, as represented by the arrow F5. In other words, the boot controller copies into the RAM 35 each table contained in the first additional configuration file 26, if the latter is determined to be present during verification according to the arrow F2, then advantageously as authentic and integral during verification according to the arrow F3. Otherwise, it is the configuration tables contained in the boot package 22 that are copied into the RAM 35.

Once the configuration tables have been copied into the RAM 35, the boot controller 24 executes an initialization program contained in the operating system 20, as represented by the arrow F6, which begins by reading the configuration tables previously copied into the RAM 35, as represented by the arrow F7. The boot sequence of the avionics system 10 according to the invention is then complete.

The boot sequence described above concerns the case where the first additional configuration file 26 is present, but not the second and third additional configuration files 60, 62, and the person skilled in the art will understand that the boot sequence is similar if the second 60 and/or third 62 additional configuration files are present, the boot controller 24 also taking care of verifying the presence of the second 60 and/or third 62 additional configuration files in the predefined locations provided for this purpose; then, advantageously, verifying their authenticity and/or integrity; and finally, copying the tables contained in these additional files into the RAM if the aforementioned verification is positive.

The person skilled in the art will also understand that, in the case of several additional configuration files, verifications are carried out in ascending order of their names, for example, first for the first additional configuration file 26, then for the second additional configuration file 60 and finally for the third additional configuration file 62, in the case of all additional configuration files.

Thus, the additional configuration file(s) 26, 60, 62, including at least one resource configuration table, make it easier to take into account changes in the execution context of the software applications 50, by allowing new configuration values to be added after the design of said software applications 50.

This additional configuration file or files 26, 60, 62 allows, in particular, to retain the benefit of the certification already carried out, and thus to avoid a new certification or recertification, and thus to significantly reduce the technical verifications and tests required.

In addition, each additional configuration file 26, 60, 62 constituted of the at least one configuration table is easier to generate and faster to load than a new version of the boot package 22 that would be modified to introduce the new configuration values. This therefore allows the performance to be improved, particularly in terms of execution and calculation time, of the electronic avionics system 10 according to the invention.

The electronic avionics system 10 according to the invention, therefore, allows changes in the execution context of avionics software applications 50 to be taken into account more easily, while significantly reducing the technical verifications and tests resulting from these changes, and having an improved system performance when these 5 changes are taken into account.

The invention claimed is:

1. A computer platform on board an aircraft and executing a set of application partitions, the platform hosting an operating system and comprising hardware resources comprising:
    a processor;
    random access memory; and
    storage memory comprising:
        a boot package comprising:
            a kernel;
            at least one resource driver;
            a set of system partitions, each system partition comprising at least one service of the operating system; and
            at least one resource configuration table, each table being selected from among the group consisting of: a table of a first type containing configuration values of said hardware resources, a table of a second type containing resource configuration values usable by a respective set of partitions, a table of a third type containing resource configuration values used by a respective partition, the first type, second type and third type being distinct from one another, one of the at least one table being of the first type; and
        a boot controller executed first following power-up of the platform and configured to launch said boot package, wherein the boot controller verifies whether an additional configuration file is present in said storage memory, and then launches the additional configuration file before said boot package, the additional configuration file including at least one resource configuration table of a type selected from the first type, second type and third type, each table of the additional configuration file then being used in place of a respective table of the same type from among said at least one table of said boot package.

2. The computer platform according to claim 1, wherein if during verification for the presence of the additional configuration file, said storage memory does not contain an additional configuration file, then said boot controller is configured to launch said boot package.

3. The computer platform according to claim 1, wherein said boot controller is configured to launch the additional configuration file only if at least one launch condition is met, each launch condition being selected from among the group consisting of: an authenticity verification of the additional configuration file, and an integrity verification of the additional configuration file.

4. The computer platform according to claim 3, wherein said boot controller is configured to launch the additional configuration file only if all the launch conditions are met from among the authenticity verification of the additional configuration file and the integrity verification of the additional configuration file.

5. The computer platform according to claim 1, wherein the computer platform operates according to an operating mode selected at least from among a degraded mode where only said set of system partitions is executable from among the sets of system partitions and application partitions, and an operational mode where the sets of system partitions and application partitions are each executable.

6. The computer platform according to claim 5, wherein at least one from among said boot package and the additional configuration file comprises a configuration table of the second type for the degraded mode, the second type table for the degraded mode containing resource configuration values usable by said set of system partitions.

7. The computer platform according to claim 5, wherein at least one from among said boot package and the additional configuration file contains at least one third-type resource configuration table for degraded mode, each third-type table related to a respective system partition for degraded mode containing the configuration values of the resources used by the system partition in degraded mode.

8. The computer platform according to claim 1, wherein said boot package and the additional configuration file each include at most one configuration table of the first type.

9. The computer platform according to claim 1, wherein if the additional configuration file includes a configuration table of the first type, then the hardware resource configuration values contained in the table each belong to value ranges for which the computer platform has been previously certified.

10. The computer platform according to claim 1, wherein said boot package and/or the additional configuration file include several configuration tables of the second type and/or several configuration tables of the third type.

11. An electronic avionics system on board an aircraft, comprising:
    a computer platform executing a set of application partitions, the computer platform being according to claim 1;
    a secondary resource configuration table, the secondary table being of the second type, stored in the storage memory, and containing resource configuration values usable by the set of application partitions; and
    the set of application partitions, each application partition comprising an avionics software application and a tertiary resource configuration table, each tertiary table being of the third type and containing configuration values of the resources used by the respective application partition, the set of application partitions being stored in said storage memory.

12. The electronic avionics system according to claim 11, wherein the avionics system comprises, in said storage memory, at least one additional configuration file.

13. The electronic avionics system according to claim 12, further comprising several additional configuration files.

14. The electronic avionics system according to claim 12, wherein each additional configuration file includes at least one configuration table, one of which is of the first type, and at least one other additional configuration file including at least one configuration table of a type selected from among the second type and third type.

15. The electronic avionics system according to claim 11, wherein each additional configuration file includes only said at least one configuration table of a type selected from the first type, second type and third type.

16. The electronic avionics system according to claim 15, wherein each additional configuration file consists of said at least one configuration table of a type selected from the first type, second type and third type.

* * * * *